(12) United States Patent
Hall (10) Patent No.: US 8,015,948 B2
(45) Date of Patent: Sep. 13, 2011

(54) CANINE PROTECTIVE SUIT AND METHOD OF USE THEREOF

(76) Inventor: Christopher Hall, Dululth, GA (US)

( * ) Notice: Subject to any disclaimer, the term of this patent is extended or adjusted under 35 U.S.C. 154(b) by 332 days.

(21) Appl. No.: 12/196,346

(22) Filed: Aug. 22, 2008

(65) Prior Publication Data

US 2010/0043725 A1 Feb. 25, 2010

(51) Int. Cl.
*A01K 13/00* (2006.01)
(52) U.S. Cl. ............................ 119/850; 54/79.1; 54/80.1
(58) Field of Classification Search ................ 119/850, 119/821, 856, 907, 837, 831; 54/79.1, 79.2, 54/79.3, 79.4, 80.5, 80.1, 80.3; 2/2.5; D30/144, D30/145
See application file for complete search history.

(56) References Cited

U.S. PATENT DOCUMENTS

| | | | |
|---|---|---|---|
| 1,437,255 A | 11/1922 | Mallinson | |
| 1,595,834 A | 8/1926 | Griffiths | |
| 1,772,827 A | 8/1930 | Caster-Udell | |
| 2,003,435 A | 6/1935 | Groff et al. | |
| 2,103,109 A | 12/1937 | De Mar | |
| 2,273,706 A | 2/1942 | Hafner | |
| 2,400,781 A | 5/1946 | Priour | |
| 2,417,803 A | 3/1947 | De Mar | |
| 3,141,443 A | 7/1964 | Huey | |
| 3,150,641 A | 9/1964 | Kesh | |
| 3,742,679 A * | 7/1973 | Jordan | 54/79.1 |
| 4,114,352 A | 9/1978 | Horton et al. | |
| 4,178,742 A | 12/1979 | Longfellow | |
| 4,355,600 A | 10/1982 | Zielinski | |
| 4,581,877 A * | 4/1986 | Wilber | 54/80.2 |
| 4,726,174 A | 2/1988 | Wilson | |
| 5,068,921 A | 12/1991 | Jones | |
| 5,271,211 A | 12/1993 | Newman | |
| 5,359,963 A * | 11/1994 | Jesse et al. | 119/850 |
| D374,315 S * | 10/1996 | Caditz | D30/145 |
| 5,732,415 A | 3/1998 | Boyd | |
| 6,138,611 A * | 10/2000 | Thielemann | 119/850 |
| 6,481,383 B1 * | 11/2002 | Ross et al. | 119/850 |
| 6,499,438 B1 | 12/2002 | Torres | |
| 6,786,028 B1 | 9/2004 | Longtin | |
| D505,756 S * | 5/2005 | Strauss | D30/145 |
| 2005/0013851 A1 | 1/2005 | Sharpe | |
| 2005/0263104 A1* | 12/2005 | Lazarowich | 119/850 |
| 2006/0032196 A1 | 2/2006 | Moss et al. | |
| 2006/0102102 A1 | 5/2006 | Bennett et al. | |
| 2007/0193532 A1 | 8/2007 | Shelton | |
| 2007/0260407 A1 | 11/2007 | Van Albert et al. | |
| 2008/0110414 A1 | 5/2008 | Buehner | |

* cited by examiner

*Primary Examiner* — T. Nguyen
(74) *Attorney, Agent, or Firm* — Williamson Intellectual Property Law, LLC; Thomas R. Williamson III (57) ABSTRACT

A canine protective suit comprising a face mask, a upper body protector and a lower body protector, wherein the face mask is removably secured to the upper body protector, and wherein the lower body protector is removably secured to the upper body protector. The upper body protector comprises elastic bands, wherein the elastic bands secure at least two front leg panels. Similarly, the lower body protector comprises elastic bands, wherein the elastic bands secure at least two back leg panels. To use, a canine's two front legs are placed into the two front leg panels as the upper body protector is placed on the canine. Similarly, the canine's rear legs are inserted into the back leg panels as the lower body protector is installed on the canine. The face mask is then disposed on the canine's face and secured to the upper body protector.

19 Claims, 5 Drawing Sheets

CANINE PROTECTIVE SUIT AND METHOD OF USE THEREOF

CROSS-REFERENCE TO RELATED APPLICATIONS

None

FEDERALLY SPONSORED RESEARCH OR DEVELOPMENT

None

PARTIES TO A JOINT RESEARCH AGREEMENT

None

REFERENCE TO A SEQUENCE LISTING

None

BACKGROUND OF THE INVENTION

1. Technical Field of the Invention

The present invention relates generally to a canine protective suit and method of protecting a canine, and more specifically to a canine protective suit comprising a face mask, a upper body protector, a lower body protector and leg panels to form a protective unit.

2. Description of Related Art

Law enforcement agencies frequently utilize specially trained canines and/or dogs for crime detection and deterrence. However, such dogs face serious dangers while assisting law enforcement officials. Such dangers include environmental hazards, extreme climate conditions and occupational risks. For example, the military utilizes dogs to detect explosives and fire departments utilize dogs in dangerous search and rescue situations. Furthermore, stress caused by prolonged exposure to dangerous conditions associated with law enforcement may cause serious bodily injury to the dogs, such as bone breakage, cuts and/or punctures. Such injuries can impact the effectiveness and productivity of the dog and can lead to the dog's disability, premature retirement or even death.

Several previous devices have attempted to provide protection to canines. One such device is a canine bullet-proof vest, wherein the device provides an outer covering that wraps around the body of the canine to protect vital organs from gunshots. The device further comprises internal pockets designed to receive bullet-proof material. While such a device protects the body of a canine from gun shots, it does not provide protection to the head or legs of the canine.

Another previous device is a protective body suit providing a protective covering for a four-legged animal having at least four openings through which the animal's legs may be inserted. Such device provides a measure of protection to the body of an animal. However, it does not prevent injury to the animal's head or eyes and does not provide an ability to detect injury to a particular area of the dog.

Another previous such device is canine apparel, which comprises an article of apparel that encloses the body of a dog to prevent the dog from becoming dirty. While such a device keeps the dog clean, it does not operate as a flotation device and does not provide protection to the animal's face.

Another previous such device is adjustable pet eyewear. The eye protection device comprises an eye enclosure that is adapted to rest against a canine's face. The device further comprises side straps that extend from opposing sides of the eye enclosure to connect to a collar adapted to be worn about the neck of the canine. While such device provides protection to the eyes of a dog, it does not provide protection to the body and legs of the dog.

Therefore, it is readily apparent that there is a need for an easily installed apparatus that provides protection to the entire body of a canine, including the canine's face, eyes, neck, back, chest, underbelly and legs, and further comprises sensors for detection of impacts to the canine.

BRIEF SUMMARY OF THE INVENTION

Briefly described, in a preferred embodiment, the present invention overcomes the above-mentioned disadvantages and meets the recognized need for such a apparatus by providing a canine protective suit and method of protecting a canine, and more specifically a canine protective suit comprising a face mask, a upper body protector, a lower body protector and leg panels, wherein the face mask is removably secured to the upper body protector, and wherein the upper body protector is removably secured to the lower body protector via fasteners, thereby protecting the canine's face, eyes, back, chest, underbelly and legs of a canine.

According to its major aspects and broadly stated, the present invention in its preferred form is a canine protective suit comprising a face mask, a lower body protector and a upper body protector, wherein the face mask is removably secured to the upper body protector. The face mask comprises a nose panel and a jaw panel. The nose panel is secured to the jaw panel via elastic bands that expand or contract to allow the canine to open or close its mouth.

The upper body protector comprises two front leg panels, wherein the two front leg panels are secured to the upper body protector via elastic bands. The two front leg panels are disposed on the canine's front legs and the elastic bands facilitate the canine's movement of its front legs. Similarly, the lower body protector comprises two back leg panels, wherein the two back leg panels are secured to the lower body protector via elastic bands. The two back leg panels are disposed on the canine's back legs and the elastic bands facilitate the canine's movement of its back legs. The lower body protector further comprises a lower back panel and a lower panel that are hingably secured together to permit a clamshell type opening for easy installation on a dog's body. The lower back panel is secured to the lower panel secure via straps and a fastener, wherein the straps adjust in length to accommodate various canine sizes.

The canine protective suit also comprises pockets dimensioned to receive hot and cold packs, sensors and/or tracking devices. The canine protective suit further comprises auxiliary panels that are externally disposed and removably secured to the canine protective suit. Alternatively, the auxiliary panels may further comprise external padding that is removably secured to the canine protective suit. Additionally, the canine protective suit may be selectively made of flotational, bullet-proof, fire resistant and non-pierceable materials, with additional protective materials, such as fabric, plastic or metal selectively secured to the canine protective suit.

The canine protective suit provides a method of protecting a canine comprising the steps of obtaining a canine protective suit having a face mask, a upper body protector and a lower body protector, each comprising pockets, wherein the upper body protector comprises at least two front leg panels, and wherein the lower body protector comprises a lower back panel, a lower panel, and at least two back leg panels. The canine's front legs are placed into the front leg panels. The upper body protector is disposed on the canine's upper back, underbelly and chest and secured therearound. The face mask is then placed on the canine's face. The canine's back legs are placed into the back leg panels. Lastly, the lower body protector is disposed over the canine's lower back and underbelly and secured therearound.

The canine protective suit is then secured together to form a unitary protective suit, wherein a fastener is utilized to removably secure the face mask to the upper body protector, another fastener is utilized to secure the upper body protector to the lower body protector, and third fastener is utilized to secure the lower back panel to the lower panel. Hot and cold packs, tracking devices, or sensors may be selectively inserted into the pockets on the canine protective suit. Further, additional padding is optionally secured to the face mask, the upper body protector, the lower body protector, the front leg panels or the back leg panels.

Additionally, the present invention is an animal protective suit comprising a face mask, a upper body protector and a lower body protector. The upper body protector is removably secured to the lower body protector. The upper body protector also comprises a slit that permits expansion and contraction of the upper body protector when the animal breathes. The animal protective suit further comprises leg panels and removable panels, wherein the leg panels are secured to the upper body protector and the lower body protector via elastic bands, and wherein the elastic bands allow the canine to easily move its legs.

More specifically, canine protective suit comprises a face mask, a upper body protector, a lower body protector, front leg panels and back leg panels. The face mask is removably secured to the upper body protector, and the upper body protector is removably secured to the lower body protector, thereby forming a unitary protective suit around the canine's legs, back, chest, underbelly and face. Additionally, the canine protective suit could comprise flotation, bullet-proof, fire resistant and/or non-pierceable materials, and could further comprise sensors or tracking devices selectively incorporated inside pockets of the canine protective suit, wherein the sensors and/or tracking devices detect injuries on the canine or determine the location of the canine.

The face mask comprises a nose panel, a jaw panel, a head panel, a neck panel, an eye shield and a front neck protector, wherein the neck panel and the head panel comprise additional padding to protect the canine's head from injury. The head panel and the nose panel are both secured to the eye shield via fasteners. The fasteners comprise, for exemplary purposes only, a rivet, a pivotal clasp, a clip, a snap, and/or the like. The nose panel protects the canine's nose and mouth and is disposed partially beneath the head panel. The nose panel comprises a top and a gap, wherein the canine's nose is exposed via the gap. The nose panel connects to the jaw panel via elastic bands, wherein the elastic bands expand or contract as the canine opens and closes its mouth. It will be recognized by those skilled in the art that the nose panel may be secured to the jaw panel via, for exemplary purposes only, a strap and/or a clip in lieu of the elastic bands.

The neck panel is disposed partially beneath the head panel and comprises a top, an end and ear cutouts. The neck panel protects the back of the canine's head, wherein the canine's ears are exposed via the ear cutouts. The end of the neck panel is secured to straps having apertures, wherein the straps secure to a neck support on the upper body protector by inserting fasteners on the neck support into the apertures. Additionally, the end of the neck panel and the jaw panel are both secured together via fasteners, wherein the fasteners secure to straps that secure to a front neck protector. The jaw panel further comprises an additional strap and fastener that secures the jaw panel to the front neck protector. It will be recognized by those skilled in the art that the front neck protector may secure to the jaw panel and the neck panel via any sort of means other than the straps and fasteners, such as, for exemplary purposes only, a clasp and/or clip.

The upper body protector shields the canine's back, chest and underbelly and comprises a upper back panel, a panel, an elastic band, a receiving buckle half, a middle panel, a lower panel, a neck support and front leg panels. The neck support comprises fasteners, wherein the fasteners are inserted into the apertures of the straps on the end of the neck panel on the face mask, thereby removably securing the face mask to the upper body protector.

Additionally, the upper back panel is secured to the neck support via a fastener, wherein the fastener may comprise, for exemplary purposes only, a clasp and/or clip, in lieu of the fastener. The upper back panel is disposed proximate the panel and an elastic band having a receiving buckle half at the end thereof. The lower panel comprises a chest portion and a bottom, wherein the chest portion covers the canine's chest and the bottom covers the canine's underbelly. The upper back panel is disposed proximate the middle panel, wherein the middle panel comprises a slit to facilitate adjustment, accommodate variability of the canine's underbelly and allow the canine to easily inhale and exhale. Further, the middle panel is secured to the front leg panels via elastic bands, wherein the elastic bands expand or contract as the canine moves its front legs, and where the middle panel may secure to the front leg panels via, for exemplary purposes only, straps and/or clasps in lieu of the elastic bands. Additionally, the front leg panels may be selectively secured to plastic panels via fasteners.

The lower body protector comprises a lower back panel, a middle panel, a lower panel, a center panel and back leg panels. The lower back panel is disposed proximate to the center panel and a strap, wherein the strap comprises a buckle half at the end thereof. The lower body protector is removably secured to the upper body protector via cooperative engagement of the buckle half with the receiving buckle half on the upper body protector.

The lower back panel extends over the canine's lower back and the lower panel extends over the canine's underbelly. The lower back panel comprises a bottom, wherein the bottom is disposed proximate a strap having a receiving buckle half at the end thereof. The lower panel comprises a top, wherein the top is disposed proximate a strap having a buckle half at the end thereof. The strap on the lower back panel and the strap on the lower panel adjust in length to accommodate variability of the canine's underbelly. The lower back panel is removably secured to the lower panel by inserting the buckle half into the receiving half buckle, thereby securing the lower back panel and the lower panel.

Additionally, the lower back panel and the lower panel are hingably secured together to permit a clamshell type opening for easy installation on a dog's body and are disposed proximate a middle panel, wherein the middle panel comprises a back and a gap, and wherein the middle panel secures to back leg panels via elastic bands. Similarly, the lower back panel and the back leg panels are secured together via elastic bands, wherein the elastic bands comprise fasteners. The elastic bands facilitate the canine's movement of its legs and also allow a person to easily install the canine protective suit on the dog. The back leg panels optionally may comprise padding for additional protection to canine's back legs.

To utilize the canine protective suit, the canine's front legs are placed into the front leg panels and the upper back panel is placed over the canine's back, wherein the top is disposed over the canine's chest, and wherein the bottom is disposed on the canine's underbelly. The face mask is then placed over the canine's face, wherein the canine's ears are placed in the ear cutouts. The lower body protector is placed over the canine's lower back and each of the canine's back legs are placed into the back leg panels, wherein the canine's tail is placed into the gap. The lower back panel is placed over the canine's back and the lower panel is placed over the canine underbelly. Lastly, the lower back panel is secured to the lower panel by inserting the receiving buckle half into the buckle half.

Subsequently, the face mask is selectively secured to the upper body protector by inserting the fasteners on the neck support into the apertures of the straps located on the face mask. The upper body protector and the lower body protector are removeably secured together by inserting the buckle half into the receiving buckle half.

In an alternate embodiment of the canine protective suit, the upper body protector, the lower body protector, the front leg panels and the back leg panels comprise interior pockets. The interior pockets are dimensioned to selectively receive hot and/or cold packs, sensors and/or tracking devices. The upper body protector and the lower body protector are secured together by a hook-and-loop fastener for assembly/disassembly of the canine protective suit. Similarly, the lower back panel and the lower panel are secured together by a hook-and-loop fastener. Lastly, the front leg panels and the back leg panels are secured to the upper back panel and the lower back panel via hook-and-loop fasteners.

Accordingly, a feature and advantage of the present invention is its ability to protect the canine's face, eyes, chest, back, underbelly and legs from puncture wounds, bone breakage or other injuries.

Another feature and advantage of the present invention is the ability to easily replace panels of the canine protective suit.

Still another feature and advantage of the present invention is the ability to detect injuries on the canine via sensors.

Yet another feature and advantage of the present invention it its ability to insulate the canine from TAZERs and other stun guns.

Yet still another feature and advantage of the present invention is its resistance to penetration from knives and other sharp projectiles.

A further feature and advantage of the present invention is its ability to be utilized as a flotation device.

Another feature and advantage of the present invention is its ability to be utilized as a tracking device.

Another feature and advantage of the present invention is its ability to accommodate hot or cold packs.

Another feature and advantage of the present invention is its fire resistance.

Another feature and advantage of the present invention is that it is bullet-proof.

These and other features and advantages of the present invention will become more apparent to one skilled in the art from the following description and claims when read in light of the accompanying drawings.

BRIEF DESCRIPTION OF THE SEVERAL VIEWS OF THE DRAWINGS

The present invention will be better understood by reading the Detailed Description of the Preferred and Selected Alternate Embodiments with reference to the accompanying drawing figures, in which like reference numerals denote similar structure and refer to like elements throughout, and in which.

DETAILED DESCRIPTION OF THE PREFERRED AND SELECTED ALTERNATE EMBODIMENTS OF THE INVENTION

In describing the preferred and selected alternate embodiments of the present invention, as illustrated in FIGS. 1-5, specific terminology is employed for the sake of clarity. The invention, however, is not intended to be limited to the specific terminology so selected, and it is to be understood that each specific element includes all technical equivalents that operate in a similar manner to accomplish similar functions.

Referring now to FIGS. 1-4B, in a preferred embodiment, canine protective suit 10 comprises face mask 20 (best shown in FIG. 2), upper body protector 30 (best shown in FIG. 3), lower body protector 40 (best shown in FIG. 4), front leg panels 50 and back leg panels 60. As described more fully below, face mask 20 is secured to upper body protector 30, wherein upper body protector 30 is secured to lower body protector 40, thereby forming a unitary protective suit around canine D's legs L, back B, chest C, underbelly U and face F, and wherein canine protective suit 10 comprises flotation, bullet-proof, fire resistant and/or non-pierceable material. Additionally, sensors/tracking devices 900 may be selectively incorporated inside canine protective suit 10 to detect injury to canine D's face F, chest C, back B, underbelly U and legs L.

Figure 2:
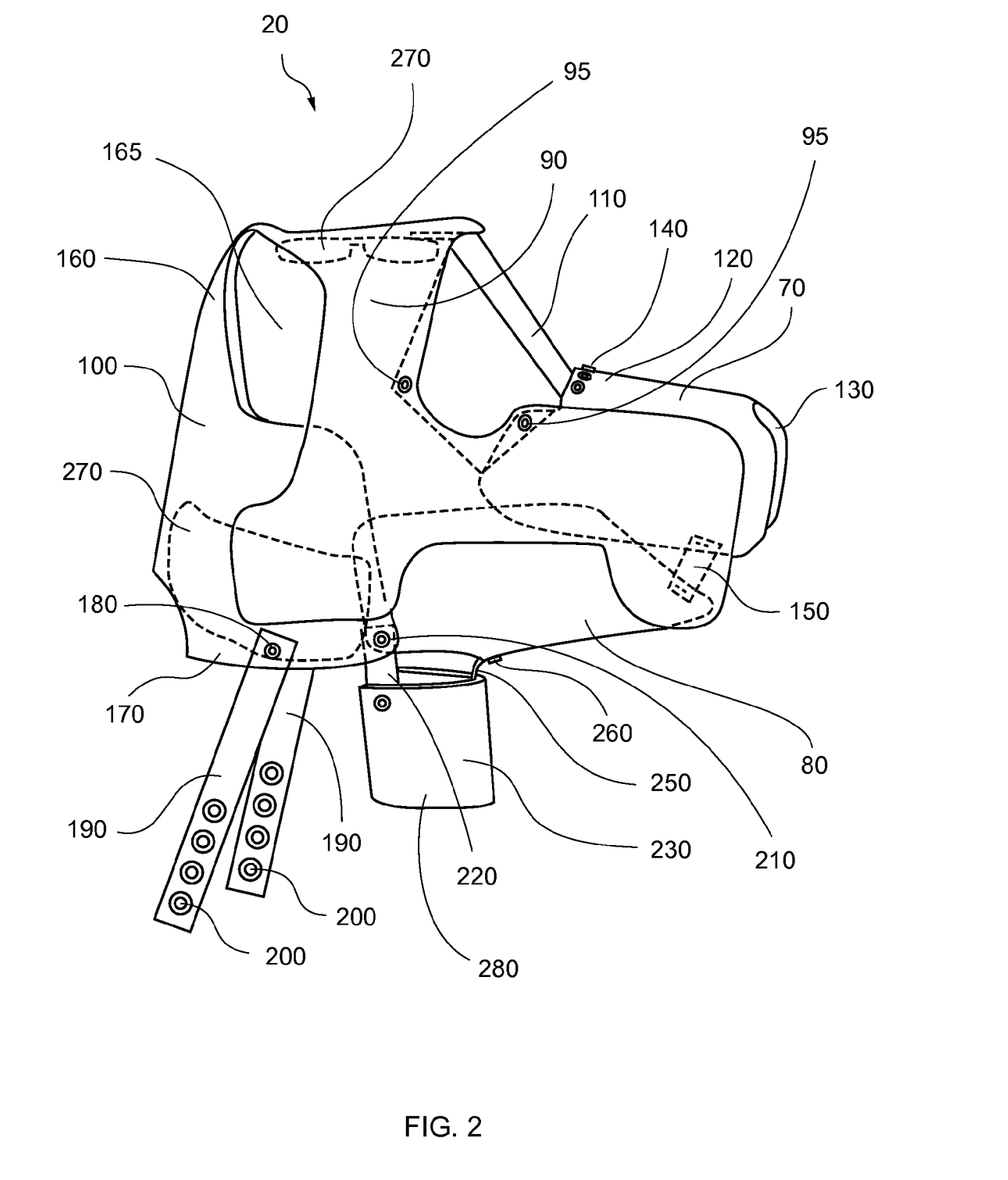
FIG. 2 is a perspective side view of a face mask of a canine protective suit according to a preferred embodiment.

Referring now to FIG. 2, face mask 20 comprises nose panel 70, jaw panel 80, head panel 90, neck panel 100, eye shield 110 and front neck protector 230, wherein head panel 90 is secured to eye shield 110 via fasteners 95, and wherein nose panel 70 is secured to eye shield 110 via fasteners 140, and wherein fasteners 140, 95 comprise, for exemplary purposes only, a rivet, a pivotal clasp, a clip, a snap, and/or the like. Nose panel 70 protects canine D's nose and mouth, wherein nose panel 70 is disposed partially beneath head panel 90. Nose panel 70 comprises top 120 and gap 130, wherein canine D's nose is exposed via gap 130. Nose panel 70 connects to jaw panel 80 via elastic bands 150, wherein elastic bands 150 expand or contract as canine D opens and closes its mouth. It will be recognized by those skilled in the art that nose panel 70 may be secured to jaw panel 80 via, for exemplary purposes only, a strap and/or a clip in lieu of elastic bands 150.

Still referring to FIG. 2, neck panel 100 is disposed partially beneath head panel 90, wherein neck panel 100 comprises top 160, end 170, and ear cutouts 165, and wherein neck panel 100 protects the back of canine D's face F, and wherein canine D's ears E are exposed via ear cutouts 165. Straps 190 are secured to end 170 of neck panel 100 via fasteners 180, wherein straps 190 comprise apertures 200, and wherein straps 190 secure to upper body protector 30 by inserting fasteners 700 on neck support 360 (best shown in FIG. 3) into apertures 190. End 170 and jaw panel 80 are secured to front neck protector 230 via straps 220 and strap 250, wherein straps 220 are secured to end 170 and jaw panel 80 via fasteners 210, and wherein strap 250 is secured to jaw panel 80 via fastener 260, and wherein fasteners 180 and 210 comprise, for exemplary purposes only, a rivet, a pivotal clasp, a clip, or the like. Front neck protector 230 further comprises end 280, wherein end 280 is removably secured to upper body protector 30 (best shown in FIG. 3). Additionally, neck panel 100 and head panel 90 further comprise padding 270 to protect canine D's neck and top of face F from injury. It will be recognized by those skilled in the art that front neck protector 230 may secure to jaw panel 80 and neck panel 100 via any sort of means other than straps 220 and 250, such as, for exemplary purposes only, a clasp and/or clip.

Figure 1:
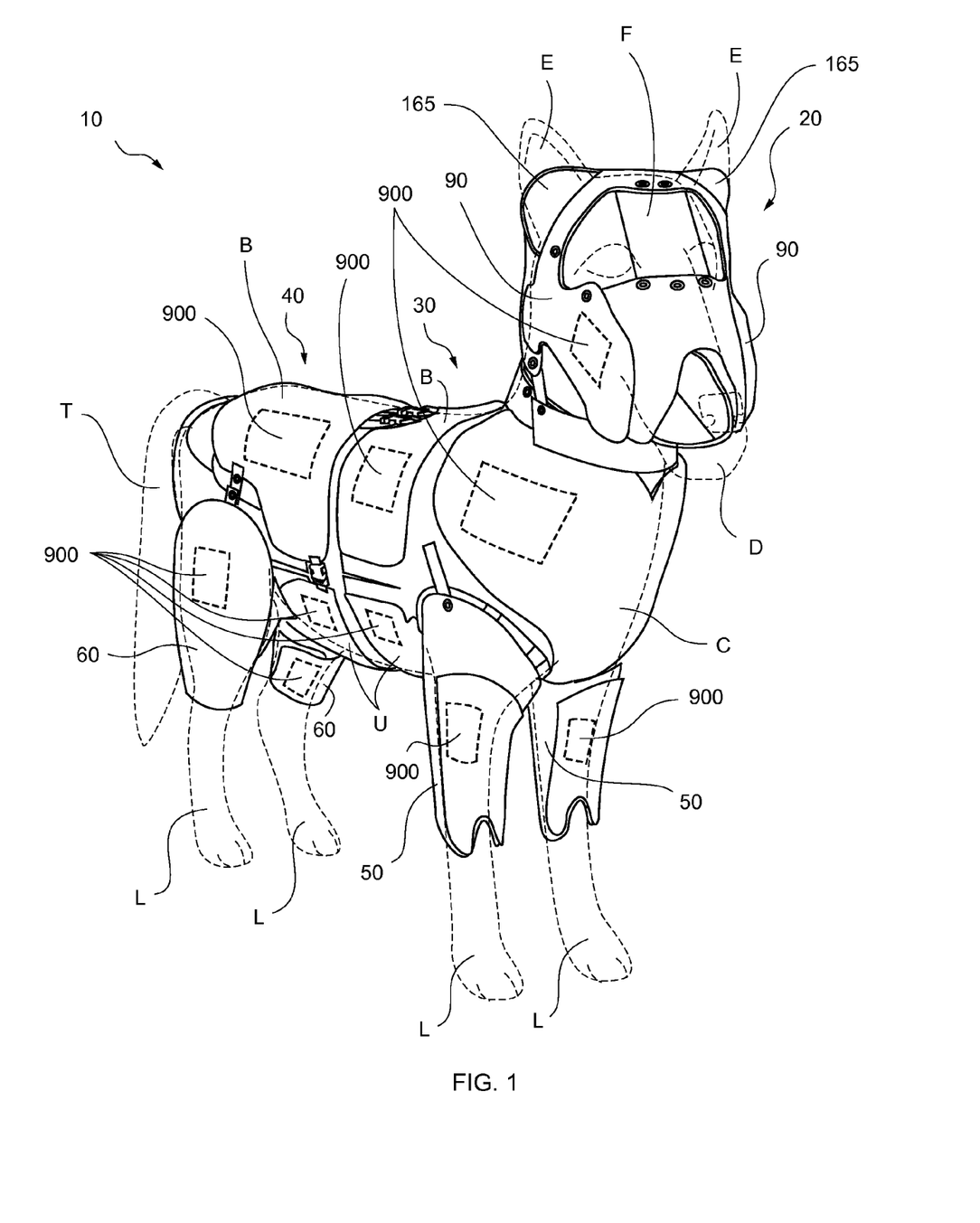
FIG. 1 is a perspective view of a canine protective suit according to a preferred embodiment, shown on a canine.
Figure 3:
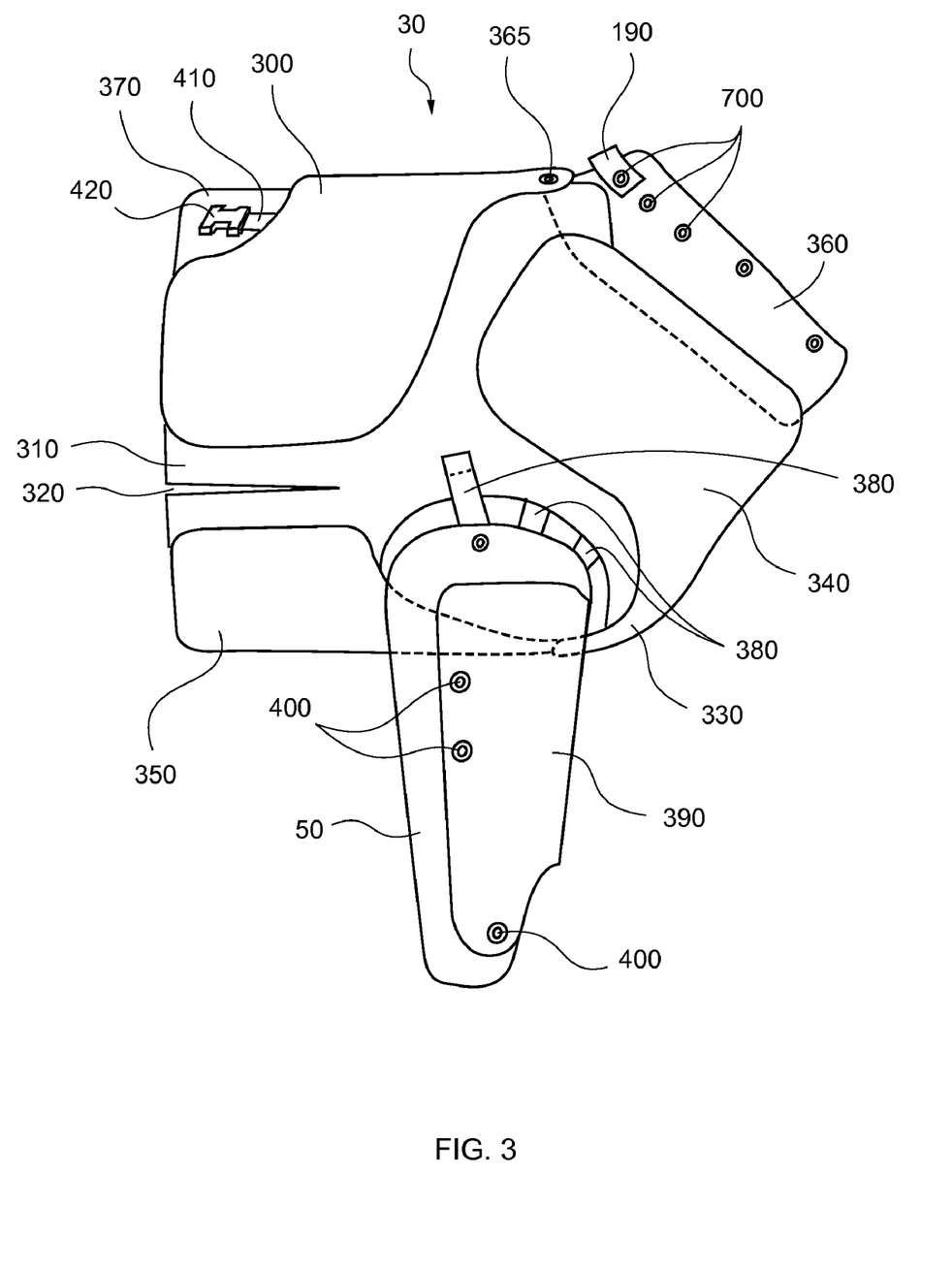
FIG. 3 is a side view of a upper body protector of a canine protective suit according to a preferred embodiment.

Referring now more specifically to FIG. 3, upper body protector 30 shields canine D's back B, chest C and underbelly U (best shown in FIG. 1). Upper body protector 30 comprises upper back panel 300, center panel 370, elastic band 410, receiving buckle half 420, middle panel 310, lower panel 330, neck support 360 and front leg panels 50. Neck support 360 comprises fasteners 700, wherein fasteners 700 are inserted into apertures 200 of straps 190 (best shown in FIG. 2), thereby removably securing face mask 20 to upper body protector 30.

Additionally, upper back panel 300 is secured to neck support 360 via pivoting fastener 365, thereby permitting upper back panel 300 to pivot upward. Upper back panel 300 is disposed proximate center panel 370 and elastic band 410, wherein elastic band 410 comprises receiving buckle half 420 at the end thereof, and wherein upper back panel 300 may be secured to neck support 360 via any suitable fastener, such as, for exemplary purposes only, a clasp and/or clip, in lieu of fastener 365. Lower panel 330 comprises chest portion 340 and bottom 350, wherein chest portion 340 covers canine D's chest C and bottom 350 covers canine D's underbelly U. Upper back panel 300 is disposed proximate to middle panel 310, wherein middle panel 310 comprises slit 320 to facilitate adjustment and to accommodate variability of canine D's underbelly U. Further, middle panel 310 is secured to front leg panels 50 via elastic bands 380, wherein elastic bands 380 expand or contract as canine D moves its front legs L, and wherein front leg panels 50 protect canine D's front legs L. Front legs of canine D may be further protected via plastic panels 390, wherein plastic panels 390 are removably secured to front leg panels 50 via fasteners 400. Middle panel 310 may be secured to front leg panels 50 via, for exemplary purposes only, straps and/or clasps in lieu of elastic bands 380.

Figure 4A:
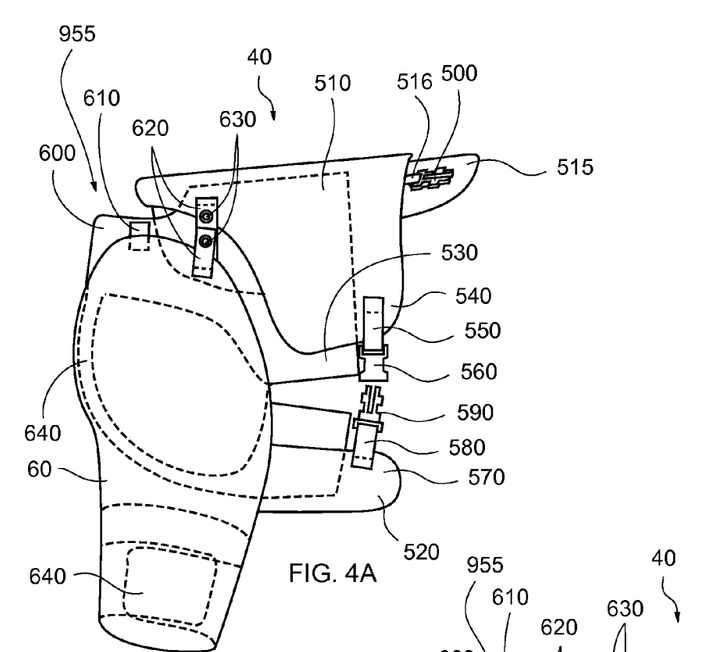
FIG. 4A is a side view of a lower body protector of a canine protective suit according to a preferred embodiment, shown open.
Figure 4B:
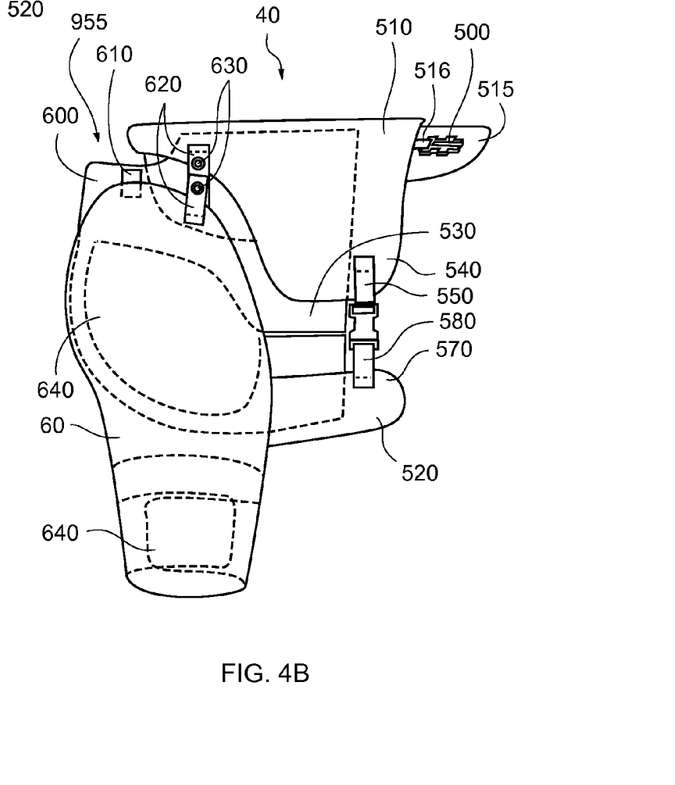
FIG. 4B is a side view of a lower body protector of a canine protective suit according to a preferred embodiment, shown closed.

Referring now more particularly to FIGS. 4A-B, lower body protector 40 comprises lower back panel 510, middle panel 530, lower panel 520, center panel 515 and back leg panels 60, wherein lower back panel 510 is proximately disposed to center panel 515 and strap 516, wherein strap 516 comprises buckle half 500 at the end thereof. Lower body protector 40 is removably secured to upper body protector 30 via cooperative engagement of buckle half 500 with receiving buckle half 420.

Lower back panel 510 extends over canine D's lower back B and lower panel 520 extends over canine D's underbelly U. Lower back panel 510 comprises bottom 540 and strap 550, wherein strap 550 comprises and buckle receiving half 560. Lower panel 520 comprises top 570, strap 580, wherein strap 580 comprises buckle half 590, and wherein strap 550 and strap 580 adjusts to accommodate variability of canine D's underbelly U. As best shown in FIG. 4B, lower back panel 510 is removably secured to lower panel 520 by inserting buckle half 590 into receiving half buckle 560, thereby securing lower back panel 510 and lower panel 520.

Additionally, lower back panel 510 and lower panel 520 are disposed proximate middle panel 530, wherein lower panel 520 and middle panel 530 are secured via stitching or the like at rear portions thereof, permitting hinged opening of lower panel 520 and middle panel 530 when buckle receiving half 560 and buckle half 590 are released, and wherein middle panel 530 comprises back 600 and gap 955. Gap 955 exposes canine D's tail T, wherein back 600 of middle panel 530 secures to elastic band 610, and wherein elastic band 610 secures back leg panels 60 to middle panel 530. Additionally, lower back panel 510 and back leg panels 60 are secured together via elastic bands 620, wherein elastic bands 620 comprise fasteners 630, wherein fasteners 630 allow a person to easily remove or attach back leg panels 60, and wherein back leg panels 60 comprise padding 640 for additional protection to canine D's back legs L.

Referring again to FIGS. 1-4B, to utilize canine protective suit 10, upper body protector 30 is placed over canine D's upper back B, chest C, and underbelly U and each front leg L of canine D is placed into front leg panels 50. Upper back panel 300 is placed over canine D's back B, wherein top 340 is disposed over canine D's chest C, and wherein bottom 350 is stretched over canine D's underbelly U. Face mask 20 is then placed over canine D's face F, wherein canine D's ears E are placed in ear cutouts 165. Lower body protector 40 is then placed over canine D's lower back B, wherein canine D's back legs are each placed into back leg panels 60, and wherein canine D's tail T is placed into gap 955. Lower back panel 510 is placed over canine D's back B and lower panel 520 is placed over canine D's underbelly U.

Subsequently, face mask 20 is removably secured to upper body protector 30 by inserting fasteners 700 into apertures 200 of straps 190. Additionally, upper body protector 30 is removably secured to lower body protector 40 are by inserting buckle half 500 into receiving buckle half 420. Lastly, lower back panel 510 is removably secured to lower panel 520 by inserting receiving buckle receiving half 590 into buckle half 560.

Figure 5:
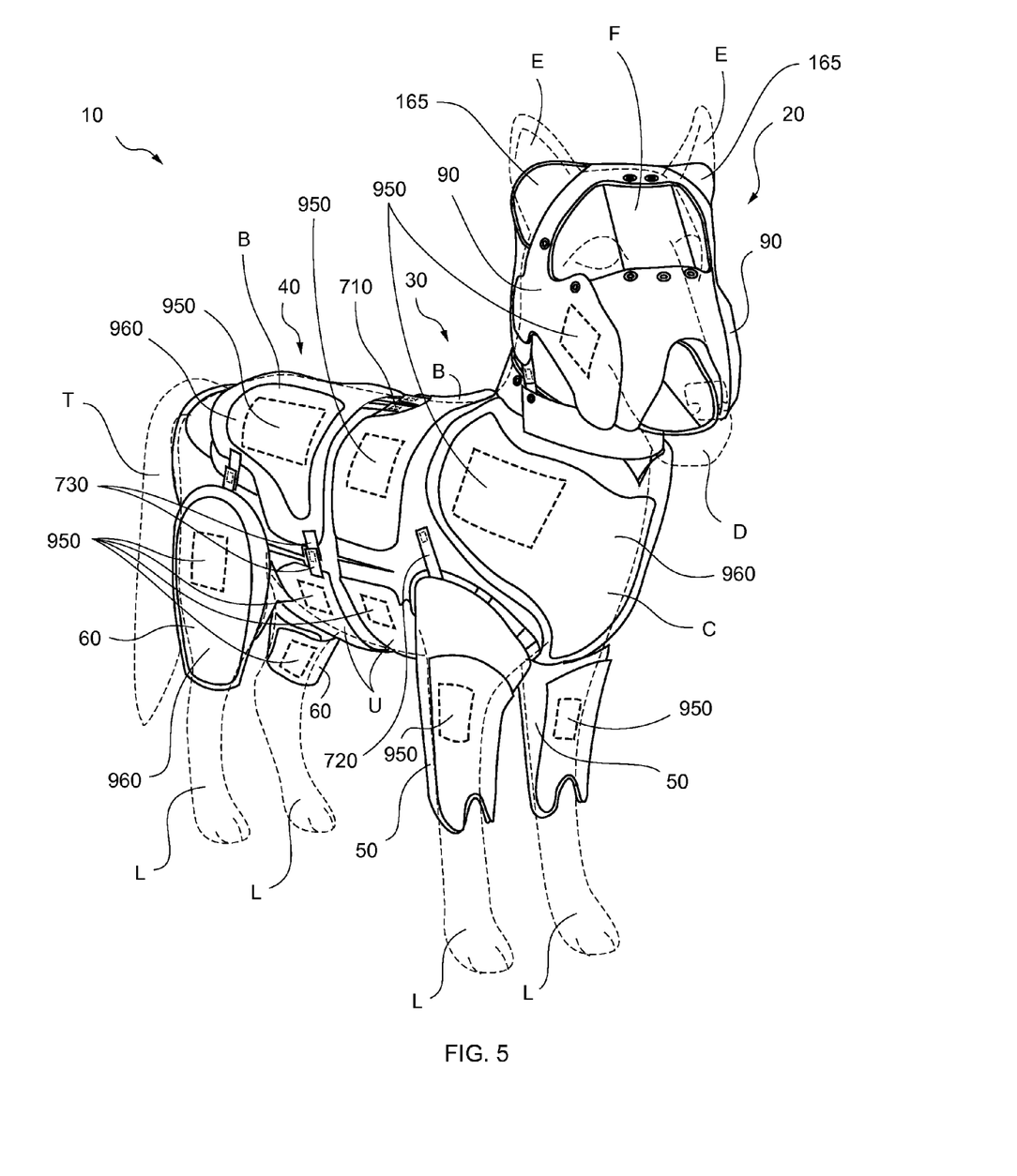
FIG. 5 is a perspective view of a canine protective suit according to an alternate embodiment, shown on a canine.

Referring now more specifically to FIG. 5, illustrated therein is an alternate embodiment of canine protective suit 10, wherein the alternate embodiment of FIG. 5 is substantially equivalent in form and function to that of the preferred embodiment detailed and illustrated in FIGS. 1-4B except as hereinafter specifically referenced. Specifically, upper body protector 30, lower body protector 40, front leg panels 50 and back leg panels 60 comprise interior pockets 950, wherein interior pockets 950 are dimensioned to selectively receive hot and/or cold packs, sensors and/or tracking devices. It will be recognized by those skilled in the art that sensors or tracking devices 900 could be disposed within or on canine protective suit 10 other than in pockets 950, such as, for exemplary purposes only, sewn into protectors 30, 40 and/or face mask 20. Additionally, upper body protector 30 and lower body protector 40 are secured together by hook-and-loop fastener 710 for assembly/disassembly of canine protective suit 10. Lower back panel 510 and lower panel 520 are secured together by hook-and-loop fastener 730. Similarly, front leg panels 50 and back leg panels 60 are secured to upper support 300 and lower back panel 510 via hook-and-loop fasteners 720 and 730, respectively. Canine protective suit 10 may further comprise auxiliary panels 960, wherein auxiliary panels 960 are removably secured to canine protective suit 10. Alternatively, auxiliary panels 960 may comprise external padding 960, wherein external padding 960 is removably secured to the exterior of canine protective suit 10. External padding 960 is in the form of removable panels secured to canine protective suit 10 via any suitable means, including without limitation, hook-and-loop fasteners, snaps, and the like. Accordingly, external padding 960 can be added to provide extra protection when so desired, and can be removed, discarded and replaced when damaged.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

What is claimed is:

1. A canine protective suit comprising:
   a face mask, wherein said face mask comprises a nose panel covering an animal's nose and a jaw panel covering an animal's jaw and wherein said nose panel is secured to said jaw panel via elastic bands, and wherein said elastic bands expand and contract as a canine opens and closes its mouth;
   a lower body protector;
   a upper body protector, wherein said face mask is removably secured to said upper body protector;
   at least two front leg panels; and
   at least two back leg panels.

2. The canine protective suit of claim 1, wherein said upper body protector comprises elastic bands, and wherein said at least two front leg panels are connected to said upper body protector via said elastic bands, and wherein said at least two front leg panels are disposed proximate a canine's front legs, and wherein said elastic bands allow said canine to move its front legs.

3. The canine protective suit of claim 1, wherein said lower body protector comprises elastic bands, and wherein said at least two back leg panels are connected to said lower body protector via said elastic bands, and wherein said at least two back leg panels are disposed proximate a canine's back legs, and wherein said elastic bands allow the canine to move its back legs.

4. The canine protective suit of claim 1, wherein said lower body protector is removably secured to said upper body protector via a cooperative fastener.

5. The canine protective suit of claim 1, wherein said lower body protector comprises a lower back panel and a lower panel, and wherein said lower back panel extends over and is disposed proximate a canine's lower back, and wherein said lower panel extends over and is disposed proximate a canine's underbelly, and wherein said lower back panel and said lower panel secure together via a fastener, and wherein said fastener adjusts to accommodate variable canine sizes.

6. The canine protective suit of claim 1 further comprising pockets dimensioned to receive hot and cold packs.

7. The canine protective suit of claim 1, wherein said canine protective suit further comprises sensors to detect injury and impact to said canine.

8. The canine protective suit of claim 1, wherein said canine protective suit further comprises tracking devices.

9. The canine protective suit of claim 1, wherein said canine protective suit further comprises auxiliary panels, and wherein said auxiliary panels are removably secured externally to said canine protective suit.

10. The canine protective suit of claim 9, wherein said auxiliary panels further comprise external padding, and wherein said external padding is removably secured to said canine protective suit.

11. The canine protective suit of claim 1, wherein said canine protective suit comprises material selected from the group consisting of flotational, bullet-proof, fire resistant, non-pierceable materials, and combinations thereof.

12. The canine protective suit of claim 11, wherein said materials are secured to a material selected from the group consisting of fabric, plastic, metal, and combinations thereof.

13. A method of protecting a canine, said method comprising the steps of:
   obtaining a canine protective suit comprising pockets, a slit, a face mask, elastic straps, a upper body protector and a lower body protector, wherein said upper body protector comprises at least two front leg panels, and wherein said lower body protector comprises a lower back panel, a lower panel, and at least two back leg panels, and wherein said at least two front leg panels are connected to said upper body protector via said elastic straps, and wherein said at least two back leg panels are connected to said lower body protector via said elastic straps, and wherein said face mask comprises a nose panel covering an animal's nose and a jaw panel covering an animal's jaw and wherein said nose panel is secured to said jaw panel via elastic bands, and wherein said elastic bands expand or contract as a canine opens and closes its mouth;
   placing a canine's front legs into said at least two front leg panels;
   disposing said upper body protector on said canine's back, underbelly and chest;
   placing said face mask over a canine's face;
   placing the canine's back legs into said at least two said back leg panels;
   disposing said lower back panel on said canine's back; and
   disposing said lower panel on said canine's underbelly.

14. The method of protecting a canine of claim 13, said method further comprising the steps of:
   utilizing fasteners to removably secure said face mask to said upper body protector, to removably secure said upper body protector to said lower body protector, and to removably secure said lower back panel to said lower panel.

15. The method of protecting a canine of claim 13, said method further comprising the steps of:
   optionally inserting hot and cold packs, optionally inserting tracking devices and optionally inserting sensors into said pockets; and
   optionally securing additional padding to at least one of said face mask, said upper body protector, said lower body protector, said at least two front leg panels and said at least two back leg panels.

16. A animal protective suit comprising:
   a face mask, wherein said face mask comprises a nose panel covering an animal's nose and a jaw panel covering an animal's jaw and wherein said nose panel is secured to said jaw panel via elastic bands, and wherein said elastic bands expand and contract as an animal opens and closes its mouth;

a upper body protector;

a lower body protector, wherein said upper body protector is removably secured to said lower body protector; and leg panels.

17. The animal protective suit of claim 16, wherein said leg panels are secured to said upper body protector and said lower body protector via elastic bands.

18. The animal protective suit of claim 16, further comprising removable panels, wherein said removable panels provide additional padding and can be replaced when damaged.

19. The animal protective suit of claim 16, wherein said upper body protector further comprises a slit, and wherein said slit permits expansion and contraction of said animal protective suit when an animal therewithin breathes.

* * * * *